(12) United States Patent
Kirk

(10) Patent No.: US 7,440,654 B2
(45) Date of Patent: Oct. 21, 2008

(54) WAVELENGTH MULTIPLEXER/DEMULTIPLEXER COMPRISING AN OPTICALLY DISPERSIVE STRATIFIED BODY

(75) Inventor: Andrew Kirk, Outremont (CA)

(73) Assignee: McGill University, Montreal (CA)

( * ) Notice: Subject to any disclaimer, the term of this patent is extended or adjusted under 35 U.S.C. 154(b) by 38 days.

(21) Appl. No.: 10/580,654

(22) PCT Filed: Nov. 26, 2004

(86) PCT No.: PCT/CA2004/002045

§ 371 (c)(1),
(2), (4) Date: May 25, 2006

(87) PCT Pub. No.: WO2005/052662

PCT Pub. Date: Jun. 9, 2005

(65) Prior Publication Data

US 2007/0127869 A1 Jun. 7, 2007

(51) Int. Cl.
G02B 6/34 (2006.01)

(52) U.S. Cl. ........................................ 385/37

(58) Field of Classification Search ............. 385/37, 385/36, 24
See application file for complete search history.

(56) References Cited

U.S. PATENT DOCUMENTS 4,957,371 A * 9/1990 Pellicori et al. ............. 356/419
6,396,617 B1 5/2002 Scalora
6,591,035 B2 7/2003 Miller et al.
2001/0012149 A1 8/2001 Lin et al.
2004/0008437 A1 1/2004 Kittaka et al.

FOREIGN PATENT DOCUMENTS

EP   73310 A  *  3/1983
JP   61248006 A  *  11/1986
JP   61248007 A  *  11/1986

OTHER PUBLICATIONS

Lin et al, Highly Dispersive Photonic Band-gap Prism, Optics Letters, vol. 21, No. 21, pp. 1771-1773, Nov. 1996.*

* cited by examiner

Primary Examiner—Quyen P Leung
(74) Attorney, Agent, or Firm—Gordon Freedman; Freedman and Associates

(57) ABSTRACT

The present invention provides a wavelength multiplexer/demultiplexer comprising a plurality of regions of optically permissive material. The plurality of regions are disposed adjacent one another in a side by side relationship in order to define a stratified body. The materials in adjacent regions have differing indexes of refraction. The stratified body has a first surface and a second surface that are positioned in a non-parallel relationship with respect to one another. The first surface is a light-receiving surface, and the second surface is a light-exiting surface.

28 Claims, 4 Drawing Sheets

WAVELENGTH MULTIPLEXER/DEMULTIPLEXER COMPRISING AN OPTICALLY DISPERSIVE STRATIFIED BODY

FIELD OF THE INVENTION

The present invention relates generally to the field of optical devices and, more particularly, to multiplexers/demultiplexers for separating and combining wavelength components of an optical signal.

BACKGROUND OF THE INVENTION

Transmitting multiple different signals on a polychromatic beam of light by using a different wavelength for each of the signals is generally referred to as wavelength division multiplexing (WDM). In order to recover the multiple signals once the polychromatic beam has been transmitted, demultiplexing techniques are used. Demultiplexing techniques are operative to spatially separate the different wavelength component signals so as to be able to recover the multiple different signals transmitted on the polychromatic beam of light.

Conversely, in order to combine a plurality of wavelength component signals into a single polychromatic beam of light, multiplexing techniques are used. Multiplexing techniques are operative to combine multiple wavelength component signals back into a polychromatic beam of light such that multiple signals can be transmitted on a single optical signal.

Multiplexers/demultiplexers are typically used in order to perform these multiplexing/demultiplexing techniques. Conventional multiplexers/demultiplexers are typically either diffractive (using diffraction gratings or array waveguide gratings), dispersive (making use of monolithic prisms for example) or use interference (for example interference coatings) to separate and recombine wavelength component signals. In addition to the examples mentioned above, there are several distinct mechanisms for achieving the diffraction, dispersion and interference effects. However, a deficiency with conventional dispersive multiplexers/demultiplexers is that they provide weak dispersion. As such, in the case of demultiplexing, the weak dispersion means that upon completion of the separation of the wavelength component signals from the polychromatic signal, the wavelength component signals are still quite close together, which causes them to be difficult to capture. This in turn makes the signals contained on each wavelength component optical signal difficult to recover.

Accordingly, there exists a need in the industry for an improved multiplexer/demultiplexer for causing the spatial separation of wavelength components of a polychromatic beam of light.

SUMMARY OF THE INVENTION

As embodied and broadly described herein, the invention provides a wavelength multiplexer/demultiplexer, comprising a plurality of regions of optically permissive material. The regions are disposed adjacent one another in a side by side relationship in order to define a stratified body. The materials in adjacent regions have differing indexes of refraction. The stratified body has a first surface and a second surface that are positioned in a non-parallel relationship with respect to one another. The first surface is a light-receiving surface, and the second surface is a light-exiting surface.

As further embodied and broadly described herein, the invention provides a wavelength multiplexer/demultiplexer, comprising a substrate and a plurality of regions of optically transparent material positioned adjacent one another in a side-by-side relationship. Adjacent ones of the plurality of regions having differing indexes of refraction and each one of the plurality of regions having a respective face contacting the substrate without contacting an adjacent one of the plurality of regions.

As still further embodied and broadly described herein, the invention provides a method for separating wavelength component signals from a polychromatic optical signal. The method comprises providing the polychromatic signal at an angle of entry to a light-receiving surface of a stratified body that comprises a plurality of regions of optically permissive material disposed adjacent one another in a side by side relationship. The adjacent regions being formed of materials having differing indexes of refraction. The method further comprises capturing the wavelength component signals at different respective angles of exit relative to a light-exiting surface of the stratified body.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of the embodiments of the invention is provided herein below with reference to the following drawings, wherein.

Figure 1:
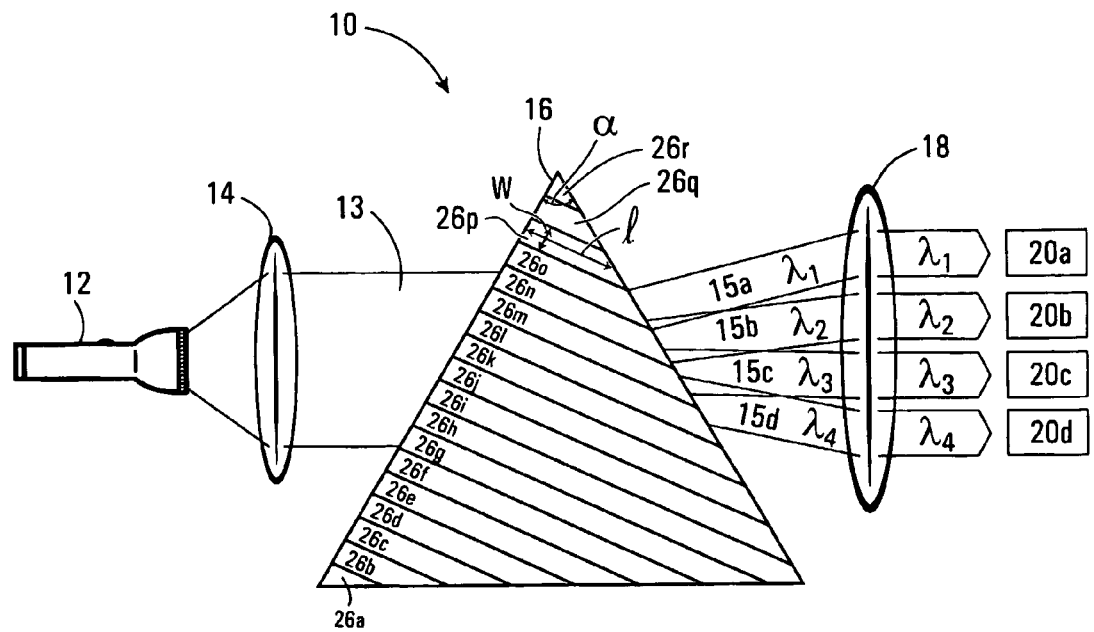
FIG. 1 shows a plan view of a multiplexer/demultiplexer in accordance with a first non-limiting embodiment of the present invention.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE PREFERED EMBODIMENTS

Shown in FIG. 1 is a wavelength multiplexer/demultiplexer 10 in accordance with a first non-limiting embodiment of the present invention. In the embodiment shown, the wavelength multiplexer/demultiplexer 10 includes a first waveguide 12, a first collimating structure 14, a stratified body 16, a second collimating structure 18 and a plurality of second waveguides 20a-20d.

The multiplexer/demultiplexer 10 is operative for either separating a polychromatic optical signal into a plurality of wavelength component optical signals, or for combining a plurality of wavelength component optical signals into a single polychromatic optical signal.

In a first example of implementation, the wavelength multiplexer/demultiplexer 10 is operative to act as a demultiplexer for spatially separating a plurality of wavelength component optical signals from a polychromatic optical signal. This is the case shown in FIG. 1, wherein the stratified body 16 receives a polychromatic optical signal 13 from the first waveguide 12 and provides a plurality of wavelength component optical signals 15a-15d to respective second waveguides 20a-20d.

In a second specific example of implementation, the wavelength multiplexer/demultiplexer 10 is operative to act as a multiplexer for combining a plurality of wavelength component optical signals into a polychromatic optical signal. For example, by reversing the direction of the beams shown in FIG. 1, the stratified body 16 would receive a plurality of wavelength component optical signals 15a-15d from the second waveguides 20a-20b and provide a polychromatic optical signal 13 to the first waveguide 12.

Figure 2:
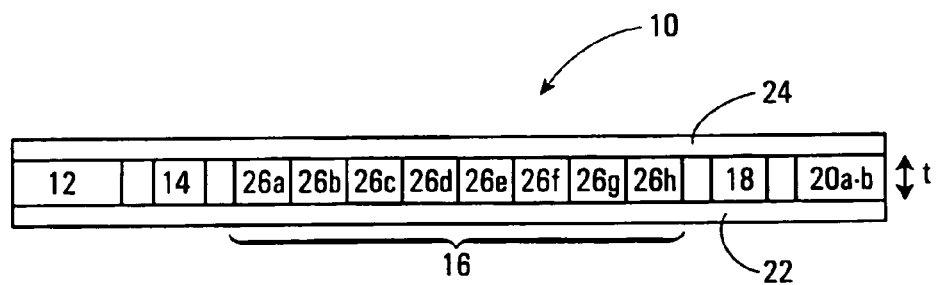
FIG. 2 shows a side view of the multiplexer/demultiplexer in FIG. 1.

Shown in FIG. 2, is a side elevation view of the multiplexer/demultiplexer 10 shown in FIG. 1, wherein the first and second waveguides 12, 20a-20b, first and second collimating structures 14, 18 and the stratified body 16 are positioned on a substrate layer 22, with a cladding layer 24 superimposed thereon. The thickness (t) of the components positioned between the substrate layer 22 and the cladding layer 24 is not a limitation of the present invention. In a non-limiting example of implementation, however, the thickness (t) may be in the order of 1-5 micrometers.

The substrate 22 and cladding layer 24 are formed of materials having lower indexes of refraction than the effective refractive index of the stratified body 16, such that total internal reflection results and there is minimal loss of the optical signals travelling through the multiplexer/demultiplexer 10. The cladding layer 24 can be formed from any standard cladding material known in the art for use with optical fibers or semiconductor optical devices, such as SiO2, silicon oxinitride, SiN, InP and GaAs, for example. In another non-limiting example of implementation, the cladding layer 24 can be ambient air, in which case the cladding layer 24 would not appear as the physical layer 24 shown in FIG. 2. In an alternative embodiment, the cladding layer can be formed from one of the materials used to form the stratified body 16, which will be described in more detail herein below.

The stratified body 16, shown in FIGS. 1 and 2, includes a plurality of regions 26a-26r of optically transparent material, that are each disposed adjacent to one another in a side-by-side relationship on the substrate 22. For the sake of simplicity, the plurality of regions 26a-26r will collectively be referred to as regions 26 for the remainder of the specification. In accordance with an embodiment of the present invention, adjacent ones of the regions 26 in the stratified body 16 are formed from materials that have different indexes of refraction.

Figure 3A:
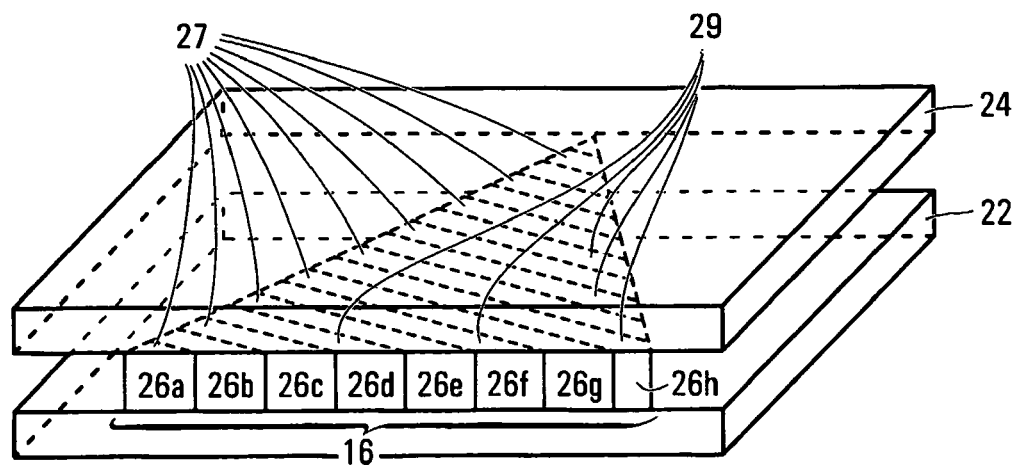
FIG. 3A shows a perspective view of a first embodiment of a stratified body positioned between a cladding layer and a substrate layer in accordance with the present invention.
Figure 3B:
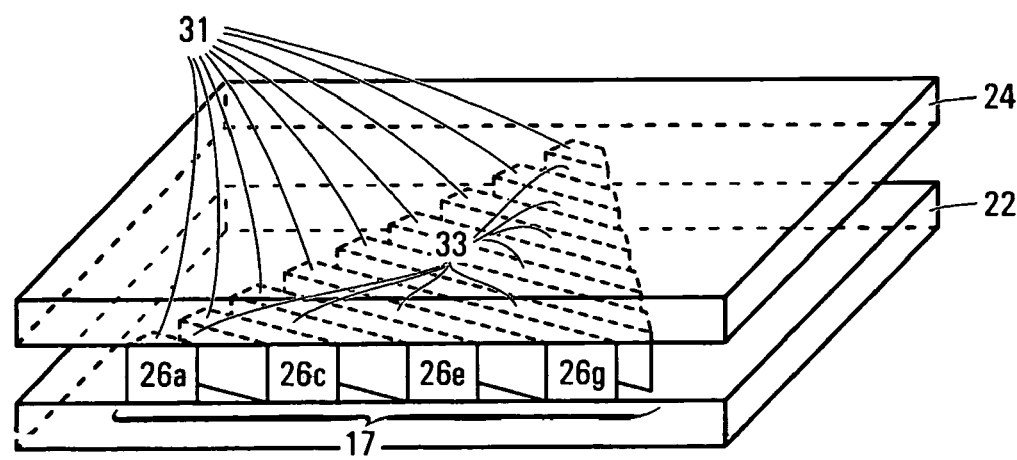
FIG. 3B shows a perspective view of a second embodiment of a stratified body positioned between a cladding layer and a substrate layer in accordance with the present invention.

Shown in FIG. 3A is the stratified body 16, in accordance with a first embodiment of the invention, positioned between a substrate layer 22 and a cladding layer 24, and shown in FIG. 3B is a stratified body 17, in accordance with a second embodiment of the invention, that is also positioned between a substrate layer 22 and a cladding layer 24.

Both stratified bodies 16 and 17 are formed of regions 26a-r, wherein the regions 26 alternate between a first material having a first index of refraction $n_1$, and a second material having a second index of refraction $n_2$, wherein $n_1$ and $n_2$ are different. In the example of implementation shown in FIG. 3A, both the first material and the second material are solid materials, whereas in the example of implementation shown in FIG. 3B, the first material is a solid material, and the second material is a fluid material, such as ambient air, for example.

For the purposes of the present description, regions 26 that are formed from the same material will be referred to collectively as a subset of regions 26. As such, in FIG. 3A, the regions 26 formed from the first solid material form a subset 27 and the regions 26 formed from the second solid material form a subset 29. Likewise, in FIG. 3B, the regions 26 formed from the solid material form a subset 31 and the regions 26 formed from the fluid material form a subset 33.

It should be understood that although stratified body 16 and stratified body 17 shown in FIGS. 3A and 3B are each formed from only two subsets of regions, in alternative examples of implementation, either stratified body can be formed from three or more subsets of regions, wherein every third or every fourth region 26 is formed of the same material, for example. In yet another non-limiting example of implementation, the regions 26 can each be formed of a different material having a distinct index of refraction n, such that each region 26 forms its own subset.

Some non-limiting examples of materials from which the regions 26 can be formed, include ambient air, glass, SiO2, SiN, InP, GaAs and AlGaAs.

Referring back to FIG. 1, each region 26 is defined by a width (w) and a length (l). As will be described in more detail further on in the specification, it may be advantageous to make the width (w) of each one of the regions 26 less than the shortest wavelength of visible light. In a non-limiting example of implementation, the regions 26 can have a width (w) in the order of 250 nm.

The regions 26 are positioned side-by-side in a lengthwise manner, wherein each one of the regions 26 has a different length (l) than its adjacent region 26. In a first non-limiting example of implementation, each one of the regions 26 is of a distinct width (w). In a second non-limiting example of implementation, the width (w) of each region in a subset of regions 26 is the same. In such a case, the width (w) of the regions in a first subset of regions 26 can either be the same or distinct from the width (w) of the regions 26 in a second subset of regions 26.

Although the regions 26 shown in FIGS. 1, 3A and 3B are linear, and have widths (w) that are constant along their lengths (l), it should be understood that it is within the scope of the present invention for the regions 26 to be non-linear, or for the width (w) of a region 26 to vary over its length. As such, each region 26 could be curved, wavy or tapered, for example.

Figure 4A:
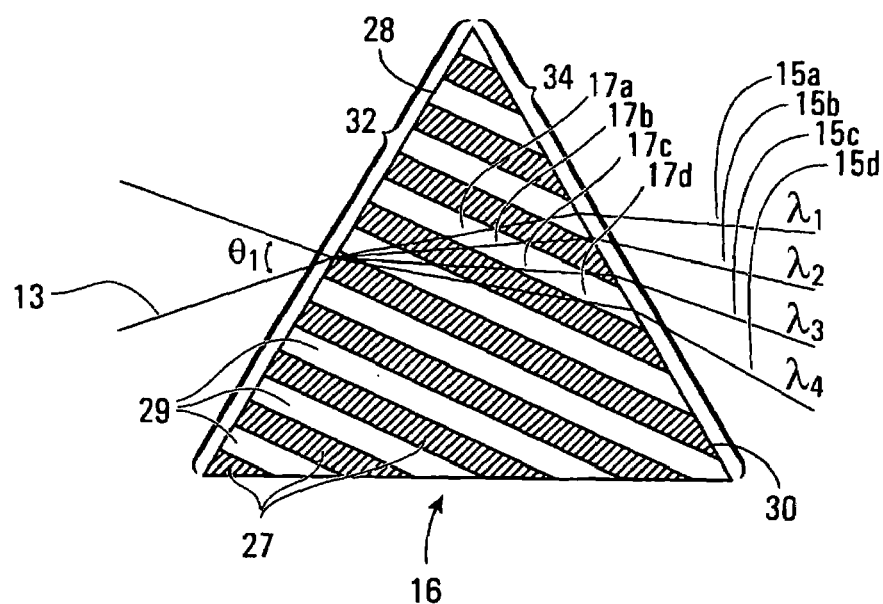
FIG. 4A shows a plan view of the stratified body of FIG. 3A with a polychromatic light beam passing therethrough.
Figure 4B:
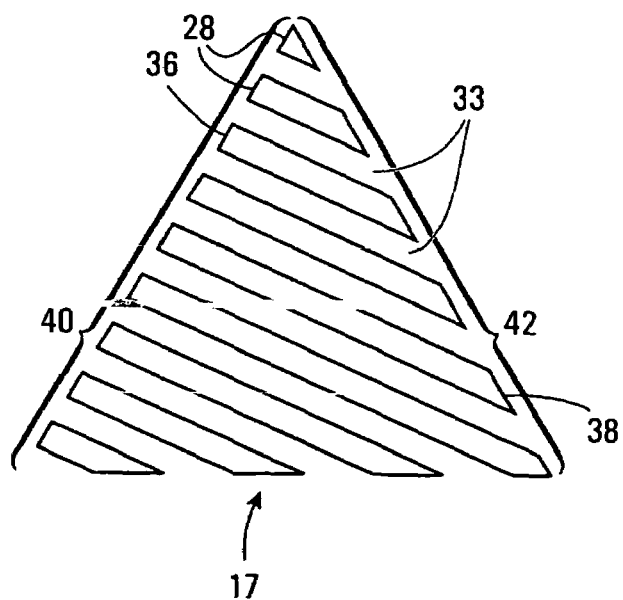
FIG. 4B shows a plan view of the stratified body of FIG. 3B with a polychromatic light beam passing therethrough.

Shown in FIG. 4A is a top view of the stratified body 16 shown in FIG. 3A, and shown in FIG. 4B is a top view of the stratified body 17 shown in FIG. 3B. As described above, the stratified body 16 includes a first subset 27 of regions 26 formed of a solid material alternating with a second subset 29 of regions 26 formed of a different solid material. Each one of the regions 26 in both the first subset 27 and second subset 29 has a first free end 28 and a second free end 30. For the sake of clarity in the Figures, the first free end 28 and the second free end 30 have been labeled on only one region 26. The first free ends 28 of the regions 26 in the first subset 27 and the second subset 29 collectively define a first surface 32. In addition, at least some of the second free ends 30 of the regions 26 in the first subset 27 and the second subset 29 collectively form a second surface 34 of the stratified body 16. In the case where the stratified body 16 acts as a demultiplexer, the first surface 32 is the polychromatic optical signal receiving surface, and the second surface 34 is the wavelength component optical signal exiting surface.

Referring now to FIG. 4B, as described above, the stratified body 17 includes a subset 31 of regions 26 formed from a solid material alternating with a subset 33 of regions 26 formed from a fluid material. In this embodiment, each one of the regions 26 in the subset 31 formed from a solid material includes a first free end 36 and a second free end 38. The first free ends 36 of the regions 26 in the subset 31 collectively form a first imaginary surface 40 of the stratified body 17, and at least some of the second free ends 38 of the regions 26 in the subset 31 collectively form a second imaginary surface 42 of the stratified body 17. Once again, in the case where the stratified body 17 acts as a demultiplexer, the first surface 40 is the polychromatic optical signal receiving surface, and the second surface 42 is the wavelength component optical signal exiting surface.

In the non-limiting embodiments shown in FIGS. 4A and 4B, the surfaces 32, 34, and imaginary surfaces 40, 42 form substantially straight lines. However, in an alternative embodiment not shown in the Figures, one or more of the surfaces 32, 34 and imaginary surfaces 40, 42 can be curvilinear. In addition, the first and second surfaces 32, 34 are non-parallel in relation to each other. Likewise, the first and second imaginary surfaces 40, 42 are also non-parallel in relation to each other. For example, the stratified body 16 can be a body having any shape and size, such as a trapezoid, so long as the light-receiving surface, and the light-exiting surface are non-parallel. In the non-limiting example of implementation shown in FIGS. 4A and 4B, the first and second surfaces 32, 34 and the first and second imaginary surfaces 40, 42 form two sides of a prism that are separated by an apex angle $\alpha$, which can range between 30 degrees and 80 degrees.

The operation of the multiplexer/demultiplexer 10 will now be described with reference to FIG. 1, which depicts stratified body 16. It should be understood that although the multiplexer/demultiplexer 10 shown in FIG. 1 uses stratified body 16, other types of stratified bodies in accordance with the present invention, such as stratified body 17, could also have been used without departing from the spirit of the invention.

In operation, the first waveguide 12, which is an optical fiber such as silicon oxynitride, provides a polychromatic optical signal to the stratified body 16 at an angle of incidence $\theta_1$. In cases where the first waveguide 12 is in close proximity to the stratified body 16, the polychromatic optical signal can travel directly from the first waveguide 12 to the stratified body 16 without the use of a collimating structure 14. However, in an alternative embodiment shown in FIG. 1, the polychromatic optical signal travels from the first waveguide 12 through a first collimating structure 14, which focuses the polychromatic optical signal onto the first surface 32 of the stratified body 16.

Figure 5:
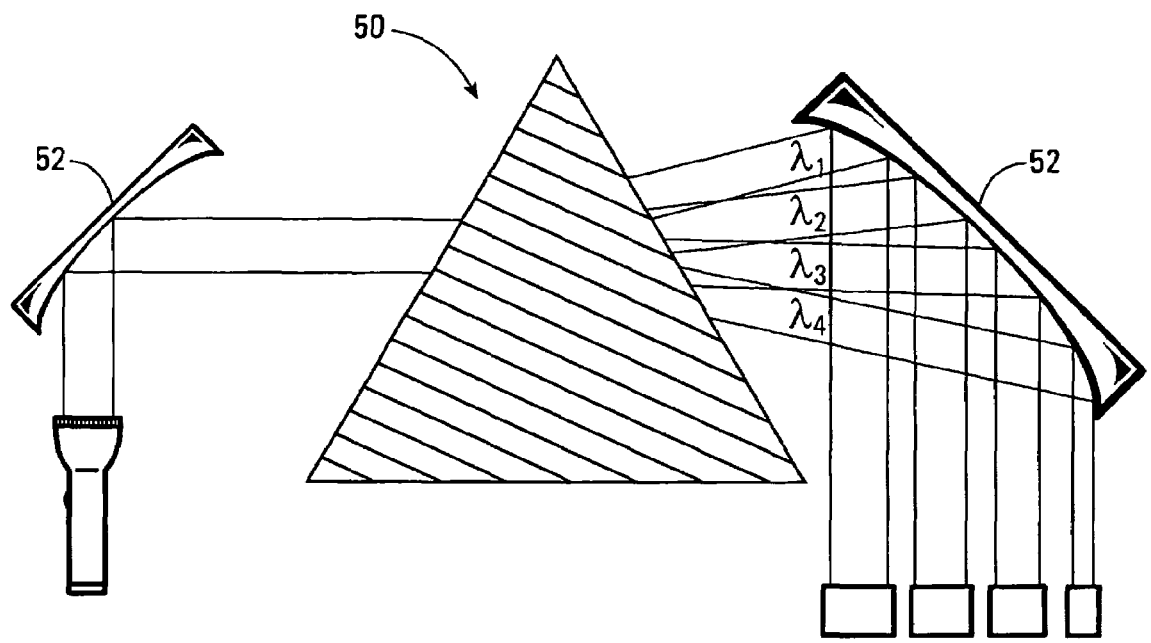
FIG. 5 shows a multiplexer/demultiplexer in accordance with a second non-limiting embodiment of the present invention.

In the embodiment of the multiplexer/demultiplexer 10 shown in FIG. 1, the first collimating structure 14, and the second collimating structure 18 are in the form of lens assemblies. However, shown in FIG. 5 is a multiplexer/demultiplexer 50 in accordance with an alternative embodiment of the invention, wherein the first and second collimating structures 14 and 18 are in the form of mirror assemblies 52.

Referring back to FIG. 1, the first collimating structure 14 focuses the polychromatic optical signal 13 onto the first surface 32 of the stratified body 16 at the angle of incidence $\theta_1$. More specifically, the polychromatic optical signal 13 is incident upon the first free ends 28 of at least some of the regions 26 of the stratified body 16. In a non-limiting embodiment of the present invention, the width (w) of each one of the regions 26 in the stratified body 16 is less than the shortest wavelength of light in order to prevent diffraction.

A plurality of wavelength component optical signals 15*a*-*d* then exit from the second free ends 30 of at least some of regions 26 on the second surface 34 of the stratified body 16.

As shown in simplified form in FIG. 4A, the polychromatic optical signal 13 is incident on the first surface 32 of the stratified body 16 at an angle of incidence $\theta_1$, which causes the polychromatic optical signal 13 to refract. The angle of refraction of the optical signal varies depending on the angle of incidence $\theta_1$ of the polychromatic optical signal 13.

As mentioned above, the indexes of refraction ($n_1$) and ($n_2$) of adjacent regions 26 in the stratified body 16 are different, which causes the stratified body 16 to have an overall effective index of refraction ($n_e$) which typically has a value intermediate between the indexes of refraction ($n_1$), ($n_2$) and which is strongly dependent on the wavelength of the incident light, thus resulting a large optical dispersion. This is generally true of all adjacent pairs of the regions 26, thus resulting in a wavelength-dependent effective index of refraction ($n_e$) for the stratified body 16 as a whole. The large dispersion due to stratification results in greater spatial separation of the wavelength component optical signals 15*a*-15*d*. Also as will be seen herein below, the non-parallel relation between the light-receiving and light-exiting surfaces cause the wavelength component optical signals 15*a*-15*d* to continue to diverge away from each other upon exiting the stratified body 16.

As shown in FIG. 4A, upon entry into the stratified body 16, the polychromatic optical signal 13 disperses into four wavelength component optical signals 17*a*-17*d* having respective wavelengths $\lambda_1, \lambda_2, \lambda_3, \lambda_4$ within the stratified body 16. It should be understood that the polychromatic beam of light 13 can include more or less than four wavelengths, but only four wavelength component optical signals 17*a*-17*d* have been shown in FIG. 4A for the sake of simplicity.

Due to the relatively large wavelength dependence of the effective index of refraction ($n_e$) of the stratified body 16, a larger spatial separation of the wavelength component optical signals 15*a*-15*d* is achieved, than if the wavelength component optical signals 15*a*-15*d* had traveled through a body formed from only one of the materials of the regions 26 in the stratified body 16.

In addition, due to the fact that the second surface 34 of the stratified body 16, which is the light-exiting surface, and the first surface 32 of the stratified body 16, which is the light-receiving surface, are non-parallel in relation to each other, the wavelength component beams 15*a*-15*d* refract at different angles as they exit the stratified body 16, such that they continue to spatially separate even as they travel outside the stratified body 16.

Referring back to FIG. 1, once the wavelength component optical signals exit the stratified body 16, each wavelength component optical signal is received by a respective second waveguide in a plurality of second waveguides 20*a*-20*d*. In the non-limiting embodiment shown in FIG. 1, the wavelength component optical signals travel from the stratified body 16 through a second collimating structure 18 before reaching the plurality of second waveguides 20*a*-20*d*. As described above, the second collimating structure 18 is operative to focus the wavelength component optical signals towards the second waveguides 20*a*-20*d*, and can be in the form of a lens assembly or mirror assembly.

The fact that the wavelength-dependent effective refractive index ($n_e$) of the stratified body 16 enables a greater spatial separation of the wavelength component optical signals 17*a*-

17d, and the fact that the wavelength component optical signals 15a-15d continue to spatially separate once they have exited the stratified body 16, enables the wavelength component optical signals 15a-15d to be captured more easily by the second waveguides 20a-20d than if they were less spatially separated. As such, the optical signals contained on the wavelength component optical signals 15a-15d can be more easily recovered.

In a specific, non-limiting example of implementation of a 16-channel demultiplexer, where wavelengths have a frequency spacing of 100 GHz around 1550 nm central wavelength, the first and second surfaces of the stratified prism are positioned at an angle of 60° in relation to one another, and a polychromatic optical signal is provided at an incidence angle of +15° (defined relative to the normal vector to the front face of the stratified prism) in order to obtain a maximum angular dispersion of approximately 0.44°/nm. The waveguide material is formed of silicon on insulator and the thickness of the stratified body is in the order of 0.5 μm with a feature size of 160 nm and a period of 320 nm. The prism sides are less than 500 μm on the long face and 300 μm on the short face. In its entirety, including mirror or lens assemblies, the demultiplexer could be less than 1.2 mm wide and 2.8 mm long.

Figure 6:
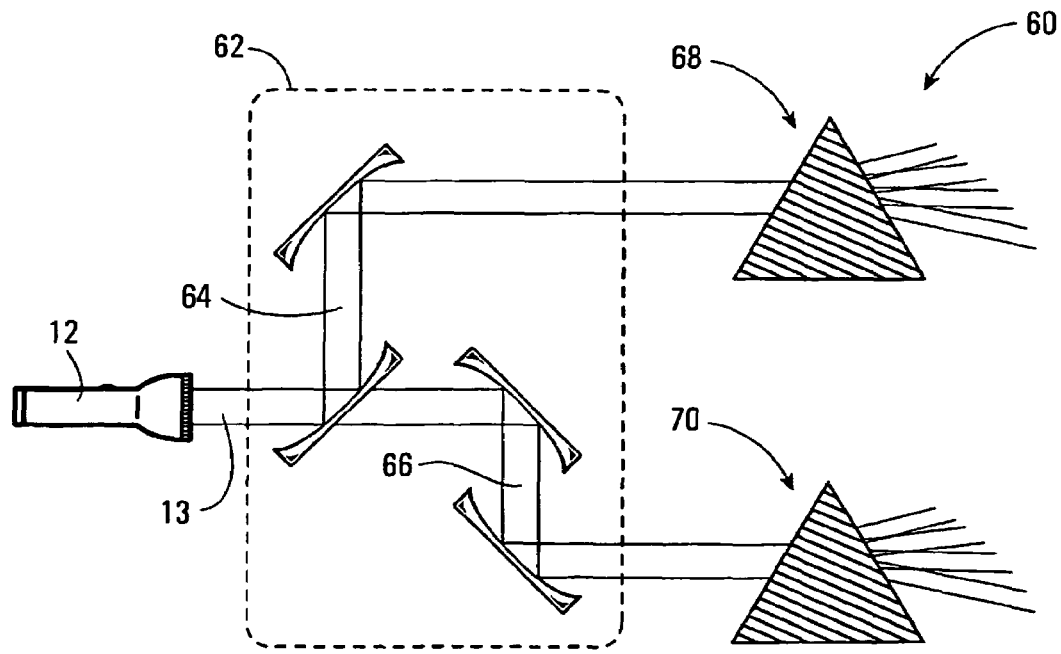
FIG. 6 shows a multiplexer/demultiplexer in accordance with a third non-limiting embodiment of the present invention.

Shown in FIG. 6, is a third embodiment of a multiplexer/demultiplexer 60 in accordance with the present invention. The multiplexer/demultiplexer 60 includes a polarization filter 62 for receiving a polychromatic optical signal 13 from the first waveguide 12. The polarization filter 62 includes a first port 64 for carrying a polychromatic optical signal having a first polarization, and a second port 66 for carrying a polychromatic optical signal having a second polarization that is different from the first. The first port 64 is connected to a first stratified body 68 in accordance with the present invention, and the second port 66 is connected to a second stratified body 70 in accordance with the present invention.

In a first example of implementation, the plurality of regions 26 of the first body 68 and the second stratified body 70 are mounted on separate substrates 22 that can be formed of different materials. In a second example of implementation, the regions 26 of the first and second stratified bodies are mounted on the same substrate 22 in a side by side fashion. The separated polarization components of each wavelength are then recombined by one or more polarization filters.

The above description of embodiments should not be interpreted in a limiting manner since other variations, modifications and refinements are possible within the spirit and scope of the present invention. The scope of the invention is defined in the appended claims and their equivalents.

What is claimed is:

1. A wavelength multiplexer/demultiplexer, comprising:
   at least a stratified body having a first surface being a light-receiving surface for receiving an input optical signal and a second surface being a light-exiting surface for providing at least an output optical signal, said second surface positioned in a non-parallel relationship with the first surface, wherein
   the stratified body comprises at least a plurality of regions of optically permissive material disposed adjacent one another in a layered relationship and being continuous between the first surface and second surface of the stratified body, the material within each region being both uniform in index of refraction, absent any periodic variation in index of refraction within the region, and having a different index of refraction to the materials in adjacent regions, and wherein
   each of the regions has a different respective length between the first and second surfaces than any adjacent one of the regions and wherein the plurality of regions are disposed side-by-side in a lengthwise manner.

2. The wavelength multiplexer/demultiplexer defined in claim 1, wherein each of the regions has a respective face contacting a common substrate without contacting any adjacent one of the regions.

3. The wavelength multiplexer/demultiplexer defined in claim 1, wherein:
   each of the regions has a first free end and a second free end;
   the first free ends of the plurality of regions collectively define the light receiving surface;
   the second free ends of the plurality of regions define the light exiting surface.

4. The wavelength multiplexer/demultiplexer defined in claim 3, wherein the light-receiving and light-exiting surfaces form substantially straight lines.

5. The wavelength multiplexer/demultiplexer defined in claim 3, wherein at least one of the light-receiving and light-exiting surfaces is curvilinear.

6. The wavelength multiplexer/demultiplexer defined in claim 1, wherein:
   the plurality of regions comprises a plurality of regions formed of a solid material and a plurality of regions formed of a non-solid material;
   each of the regions formed of a solid material has a first free end and a second free end;
   the first free end of each of the regions formed of a solid material collectively define the light-receiving surface;
   the second free end of at least some of the regions formed of a solid material define the light-exiting surface.

7. The wavelength multiplexer/demultiplexer defined in claim 6, wherein the plurality of regions formed of a non-solid material are formed of ambient air.

8. The wavelength multiplexer/demultiplexer defined in claim 7, wherein the light-receiving and light-exiting surfaces form substantially straight lines.

9. The wavelength multiplexer/demultiplexer defined in claim 7, wherein the light-receiving and light-exiting surfaces are curvilinear.

10. The wavelength multiplexer/demultiplexer defined in claim 1, wherein:
    the plurality of regions comprises a first plurality of regions alternating with a second plurality of regions;
    each of the first plurality of regions has a substantially identical first width;
    each of the second plurality of regions has a substantially identical second width.

11. The wavelength multiplexer/demultiplexer defined in claim 10, wherein said first width is substantially the same as said second width.

12. The wavelength multiplexer/demultiplexer defined in claim 10, wherein said first width and said second width are distinct.

13. The wavelength multiplexer/demultiplexer defined in claim 1, wherein;
    each of the regions bas a respective length;
    at least some of said regions have a width that varies over the length of the respective region.

14. The wavelength multiplexer/demultiplexer defined in claim 1, wherein at least one of said regions is curved along its length.

15. The wavelength multiplexer/demultiplexer defined in claim 1, wherein each of said regions has a respective width that is less than the shortest wavelength of visible light.

16. The wavelength multiplexer/demultiplexer defined in claim 1, further comprising a cladding layer, wherein each of the regions has a respective second face contacting the cladding layer without contacting any adjacent one of the regions.

17. The wavelength multiplexer/demultiplexer defined in claim 16, wherein the plurality of regions includes a first subset of regions formed of a first material, wherein said cladding layer includes a material substantially identical to the first material.

18. The wavelength multiplexer/demultiplexer defined in claim 1, the wavelength multiplexer/demultiplexer further comprising:
    a first collimating structure and a second collimating structure disposed on the substrate;
    the first collimating structure being adapted to collimate an incoming polychromatic optical signal towards the light-receiving surface;
    the second collimating structure being adapted to focus an optical signal received from the light exiting surface towards an outgoing optical waveguide.

19. The wavelength multiplexer/demultiplexer defined in claim 18, wherein at least one of the first and second collimating structures is a lens assembly.

20. The wavelength multiplexer/demultiplexer defined in claim 18, wherein at least one of the first and second collimating structures is a mirror assembly.

21. The wavelength multiplexer/demultiplexer defined in claim 1, the wavelength multiplexer/demultiplexer further comprising:
    a first waveguide for supplying the input optical signal to the light receiving surface;
    a plurality of second waveguides for receiving a plurality of outgoing wavelength component optical signals from the light exiting surface.

22. The wavelength multiplexer/demultiplexer defined in claim 1, further comprising:
    a plurality of first waveguides for supplying a plurality of incoming wavelength component optical signals to the light-receiving surface, the plurality of incoming wavelength component optical signals forming the input optical signal;
    a second waveguide for supplying receiving an outgoing polychromatic optical signal from the light-exiting surface, the outgoing polychromatic optical signal being the output optical signa1.

23. The wavelength multiplexer/demultiplexer defined in claim 18, further comprising:
    a first waveguide for supplying an incoming polychromatic optical signal to said first collimating structure.

24. The wavelength multiplexer/demultiplexer defined in claim 23, further comprising:
    a plurality of second waveguides for receiving a plurality of outgoing wavelength component optical signals from said second collimating structure.

25. An optical device assembly, comprising:
    a polarization filter having a first port for carrying an optical signal having a first polarization and a second port for carrying a signal having a second polarization different from the first polarization;
    a first wavelength multiplexer/demultiplexer as per claim 20 connected to the first port;
    a second wavelength multiplexer/demultiplexer as per claim 20 connected to the second port.

26. The optical device assembly defined in claim 25, wherein the first and second wavelength multiplexer/demultiplexers are on separate substrates.

27. A wavelength multiplexer/demultiplexer, comprising:
    a substrate;
    a plurality of regions of optically transparent material positioned adjacent one another in a side-by-side relation in a lengthwise manner each region characterized by a length and by a uniform index of refraction absent any periodic variation within the region;
    adjacent ones of the regions having differing indexes of refraction and different lengths between the first and second surfaces than any adjacent region; and
    each one of the plurality of regions having a respective face contacting the substrate without contacting an adjacent one of the plurality of regions.

28. A method of separating wavelength component signals from a polychromatic optical signal, comprising:
    providing the polychromatic signal at an angle of entry to a light-receiving surface of a stratified body comprising a plurality of regions of optically permissive material each disposed adjacent one another in a side by side relationship in a lengthwise manner, the material within each region being uniform in index of refraction, absent any periodic variation in index of refraction within the region, and having a different index of refraction to the materials in adjacent regions, each reason having a different length between the first and second surfaces than any adjacent region;
    providing a plurality of wavelength component signals at different respective angles of exit relative to a light-exiting surface of the stratified body, the plurality of wavelength component signals being generated in dependence upon at least a wavelength spectral content of the polychromatic signal and the stratified body.

* * * * *